E. W. Rowley, Jr
Pea Rake.
N° 66,891.        Patented Jul. 16, 1867.
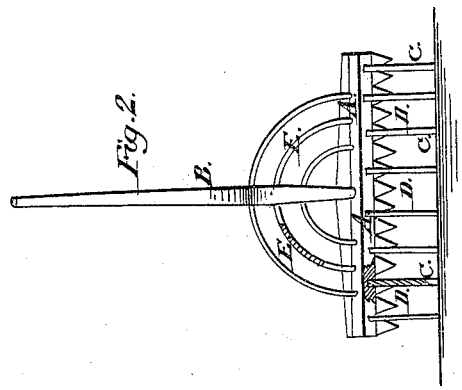
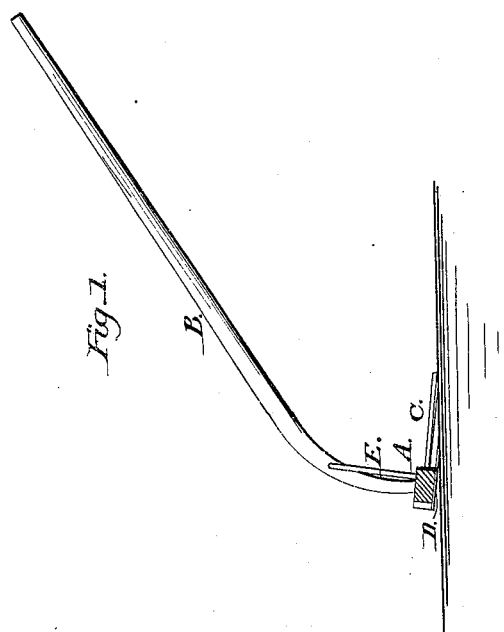
Witnesses:
Inventor:
E. W. Rowley, Jr.
Per   Attorneys.

United States Patent Office.

EMERY W. ROWLEY, JR., OF ANTWERP, NEW YORK.

Letters Patent No. 66,891, dated July 16, 1867.

PEA-RAKE.

The Schedule referred to in these Letters Patent and making part of the same.

TO ALL WHOM IT MAY CONCERN:

Be it known that I, EMERY W. ROWLEY, Jr., of Antwerp, in the county of Jefferson, and State of New York, have invented a new and improved Pea-Rake; and I do hereby declare that the following is a full, clear, and exact description thereof, which will enable those skilled in the art to make and use the same, reference being had to the accompanying drawings, forming part of this specification, in which—

Figure 1 represents a side view of my improved pea-rake.

Figure 2 is a front view partly in section of the same.

Similar letters of reference indicate corresponding parts.

This invention relates to a new rake for raking peas, and consists in the attachment to an ordinary hand or other rake of a serrated or toothed cutter, the cutting edge of which projects below the head of the rake, so as to cut the pea-straw close to the ground as the rake is drawn over the same.

A represents the head of an ordinary hand-rake. B is the handle of the same. C are its wooden or other tines or prongs. D is a toothed knife of about the same length as the head A. It may be composed of one or more pieces, and is secured to the outer side of the latter by means of screws or rivets, or otherwise, and its teeth are made to project below the head, as shown. Fig. 1 shows the position in which the rake is drawn over the ground, and from it is clearly seen that the straw will be cleanly cut even with the surface of the ground, when the rake is drawn over the ground in the manner shown. The head is strengthened by means of bows E, as shown. If desired, this device may be applied with equal effect on horse-rakes as well as on hand-rakes of every description.

I claim as new, and desire to secure by Letters Patent—

Providing a pea-rake with a serrated or toothed cutter, D, substantially in the manner and for the purpose herein shown and described.

EMERY W. ROWLEY, JR.

Witnesses:
A. CHAPIN,
G. H. NICHOLS.